United States Patent [19]
Chandler

[11] Patent Number: 5,440,831
[45] Date of Patent: Aug. 15, 1995

[54] CASTABLE AND ADJUSTABLE FISHING BOBBER

[76] Inventor: John W. Chandler, 710 S. 7th St., Fairfield, Iowa 52556

[21] Appl. No.: 180,451

[22] Filed: Jan. 12, 1994

[51] Int. Cl.$^6$ .............................................. A01K 93/00
[52] U.S. Cl. ................................... 43/43.11; 43/44.92
[58] Field of Search .................... 43/43.11, 44.9, 44.92

[56] References Cited

U.S. PATENT DOCUMENTS

| | | | |
|---|---|---|---|
| 2,669,054 | 2/1954 | Smith, Sr. | 43/43.11 |
| 2,795,077 | 6/1957 | John | 43/43.11 |
| 3,084,468 | 4/1963 | Christophel | 43/43.11 |
| 3,141,256 | 7/1964 | McBriar | 43/43.11 |
| 3,340,644 | 9/1967 | Lintz | 43/43.11 |
| 3,611,613 | 10/1971 | Perches | 43/43.11 |

*Primary Examiner*—P. Austin Bradley
*Assistant Examiner*—Jeanne M. Elpel

[57] ABSTRACT

A fishing bobber (21) utilizing a dual spool (22) rotatably mounted between two flotation chambers (35) in such a way that a fishing line (42) enters, passes through, and exits the bobber (21) in an approximate straight line by means of two entry/exit slits (33) Which are situated off-center in bobber (21). Fishing line (42) intersects an inner drum surface (26) of dual spool (22) at a tangent. Line (42) then wraps around one of the drum surfaces (26) and then passes through a center ridge (28) of the spool (22) by means of an open slit (32) whose shape zig-zags or folds back upon itself in order to secure the line (42). Bobber shell (21) is composed of two halves (34) which are held together with either a detachable hinge (4), or a living hinge (48), combined with a clasp and pin assembly (25); or by an axle shaft (50), or by threaded edges (66) and (68) on the two bobber halves (34).

18 Claims, 10 Drawing Sheets

CASTABLE AND ADJUSTABLE FISHING BOBBER

BACKGROUND-FIELD OF INVENTION

This invention relates to bobbers or floats used in fishing, specifically those bobbers which are castable and adjustable.

BACKGROUND-DESCRIPTION OF PRIOR ART

The concept of using bobbers or floats in order to suspend a baited hook or lure for fishing is as old as fishing itself. Throughout the centuries various approaches have been tried with only varying degrees of success.

The original bobbers were merely pieces of wood or any other buoyant objects such as a sealed bottle or a piece of cork which were tied to the fishing line at some desired distance from the hook in order to determine the depth at which the hook was to be suspended. The essential flaw with this approach and also with many of the less sophisticated bobbers of today is that they were fixed in their position on the line. This created several problems for fishermen.

The first problem was in casting. Since the bobber was set in one place, this meant there could be anywhere from a few feet to many tens of feet of line hanging from the bobber down to the hook. If a fishing rod was used to cast the line out, then the line could only be reeled as far as up to the bobber since it was fixed in place. The remaining line was left hanging from the end of the rod. This meant the fisherman would have to lift all this extra line out of the water and attempt to use the rod to whip all that line and the hook around with sufficient speed in order to cast it in the desired direction. This procedure was very awkward, inaccurate, and sometimes dangerous due to the lack of control when whipping a sharp hook around. It also meant that because of the distance between the hook and the bobber, they would each land in the water at different locations. Then, as the hook settled down in the water, the bobber and hook would finally come to rest at some point in-between where the two landed, which was usually not the originally intended location.

The second problem with fixed bobbers is in retrieval. When retrieving the hook to recast or when retrieving a fish, the line can only be reeled in up to the point where the bobber contacts the end of the fishing rod. At that point, either the rod must be lifted high in the air to raise the hook out of the water, or the line must be grabbed by hand and the fish pulled in manually. In the case of retrieving a fish, this lack of control and lack of close contact can often result in losing the fish before it is landed.

The significance of these problems with fixed position bobbers has been enough to discourage many fishermen from ever using bobbers. The inability to effectively cast and retrieve fixed bobbers has made casting with artificial lures much more appealing to many fishermen. In order to overcome this problem, many manufacturers designed a newer type of bobber called a "slip bobber."

The general design of a slip bobber is to have some type of flotation chamber or buoyant material acting as the main body of the bobber. Then a hollow tube or groove is passed or cut through the central axis of the bobber from top to bottom. The bare fishing line is passed through this tube or groove and tied to the hook. The bobber is then slid up the line to the desired fishing depth, at which point some type of a stopper is secured to the line. One type of stopper can be a small bead with a narrow slit cut half way into one side into which the line is wedged and the bead is then pinched down tight onto the line. Other types of stoppers used are pieces of string or very small springs which are wrapped cylindrically around the line at the desired stopping point. This approach is definitely much better than a fixed position approach; however, all of these methods of using stoppers, which attach to the fishing line to stop the sliding motion of the bobber, create several major problems for fishermen.

The first problem is that the beads, strings, springs etc. can catch in the eyelets of the rod as the line passes through or jam up inside the reel. This often results in fouled casts and retrievals or even completely jammed reels.

The second problem is that for most of these slip bobbers, the line must first be removed from the hook, trimmed at the end in order to get a clean straight end, slid through the stopper, if a string or spring is used, and then slid through the bobber tube or slit and retied to the hook. If a bead is used, the bead must now be attached to the line at the desired point of depth. This entire procedure is very time consuming, both to attach and remove a slip bobber and stopper, and thus makes the choice to fish with a bobber a much more arduous task.

In order to solve this problem, many inventors over the years have attempted to use some type of internal mechanism within the bobber itself to stop the bobber at the desired depth without the need for permanently fixing the bobber to the line or the need to use stoppers attached semi-permanently to the line as with slip bobbers. The most promising approach has been to use a "dual spool" mechanism which rotates within the bobber or within some type of housing. As the bobber moves up and down the line, this dual spool causes the fishing line to be rolled up on one spool as it simultaneously unrolls an equal amount from the other spool. When the bobber has moved all the-way up the line to the selected depth point, all the line from the hook to the bobber will have been unwound from one spool and an equal amount of line will have been wound up on the second spool. However, all of these previous attempts at using this principle have been unsuccessful because of certain fundamental flaws in their design and manufacture. Relevant art is listed below.

In U.S. Pat. No. 541,789 to Kunzelman (1895), a dual spool is placed within a flotation housing; however, the major flaw with this design, and with most others, is that the fishing line is forced to enter and exit the flotation housing at an angle to the inner drum surface of the dual spool, as shown in Kunzelman's FIGS. 1–5. This is because he attempts to have the line enter at the top center of the bobber and exit at the bottom center. Once the line enters the bobber, it must then angle sharply to one side or the other and also to the front or back in order meet the inner drum surface of either the left or right side of the dual spool upon which it will be wound up.

As weight or pressure is applied to the line, either from the sinker weights or from a fish, the line will naturally attempt to straighten out. Therefore, any bending or angling of the line causes significant friction and pressure to build up between the dual spool, the bobber housing and the fishing line as the line attempts to straighten. Since the fundamental principle of operation is that the spool must be able to rotate without friction and since it uses the force of gravity to rotate the dual spool, then in this design that very force will be enough to create friction between the spool, the housing, and the line, and thereby obstruct the frictionless rotation of the spool and the movement of the line which is essential for this principle to work.

Kunzelman also uses a slit in the center ridge of his dual spool through which to pass the line to the second spool. This slit radiates outward perpendicular to the inner drum surface. This approach has been shown not to work since once the line is completely unwound from one spool it will be pulled out of the slit and be allowed to cross over the center ridge, which provides the stopping action, and then unwind the second spool at the same rate it is being wound up. This action eliminates the ability of the bobber to stop at it's preselected depth.

In U.S. Pat. No. 1,973,028 to Thomas (1934), an attempt is made to allow the line to enter the bobber from the side and exit at the bottom center of the bobber thereby forming an approximate 90 degree angle between the entry and exit points. This approach suffers from the same problem as Kunzelman's in that once any tension or pressure is applied to the line it will attempt to straighten, thereby placing great pressure upon the dual spool, the bobber housing, and the fishing line. If this pressure is great enough, and if the line is strong enough, then not only will the bobber not move on the line as intended, but the straightening action of the line may break the bobber apart.

Thomas then attempts to overcome the problem of Kunzelman's perpendicular slit in the center ridge by using an eyelet or small cylindrical hole instead. Since this hole is not open to the outer edge of the center ridge it does effectively prevent the line from jumping from one spool to the other and thereby preserves the ability of the bobber to stop at the desired depth. However, because this hole is not open in any way to the outer edge of the central ridge, it means that the line must be detached from the hook, passed through this hole and then reattached to the hook. One thereby loses the advantage of being able to attach and detach the bobber with ease and without having to remove the hook.

In U.S. Pat. No. 2,190,113 to Chreitzberg (1940), the same problem of sharply angling the line within the bobber is found again. He actually increases the problem by separating the dual spool into two spools which increases the distance between them and thereby increases the side to side angle at which the line must pass.

In U.S. Pat. No. 2,479,642 to Schiffmann (1949), the dual spool is actually suspended beneath a flotation chamber and housed in a metal bracket. He then uses external guide eyelets to direct the line to and from the spool. Here again the line is not allowed to pass through the bobber in a straight line at a tangent to the inner drum surfaces of the dual spool. He also makes the inner drum surfaces of the two spools unequal in diameter in an attempt to reduce, but not eliminate, the interior angle of the line. By placing the spool outside the flotation chamber, the entire assembly also becomes much larger and more awkward than necessary.

In U.S. Pat. No. 2,728,161 to Mangel et al (1955), a single spool is housed within a metal bracket and the amount of rotation of this spool, and thereby the amount of movement possible for the bobber, is controlled by a sliding nut on a bolt assembly housed within the spool. This is a very different concept and approach than using a dual spool and still suffers from the same problem of angling the line from the points of entry and exit to the drum surface of the spool.

In U.S. Pat. No. 2,734,304 to Yulich (1956), the dual spool is carved to act as both the spool and the flotation assembly with a metal arm and eyelet hole protruding from the center of the bobber to each side to act as line guides. Here again the same problem is found. As soon as the line enters one of the eyelets, it is forced to angle sharply over in order to meet the inner drum surface of one of the dual spool chambers. Also, because he passes the metal eyelet bracket through the center of the bobber, he must then pass the line around the outside of the bobber, back through the central axis to the other side and up around to the other spool channel. While this may accomplish the same function as passing the line through a center ridge of a dual spool, it is far more awkward and difficult to use. It also requires the removal of the hook in order to pass the line through the center of the bobber.

In U.S. Pat. No. 3,057,107 to Finnicum (1962), the dual spool is created out of the flotation ball which is then housed in a metal bracket. The channels of the dual spool are tilted slightly off their normal axis in order to deal with one aspect of the left and right angling of the line encountered in other designs. However, the same problem of bending or angling the line occurs along the front to back axis since the line enters at the top center and exits at the bottom center which means it must bend sharply in order to meet the inner drum surface of the spool channels. He also uses radially extending slits in the central ridge extending perpendicularly from the inner drum surface outwards to the edge of the central ridge. He then suggests tying a knot in the line and wrapping it through one slit and then over through another slit. This arrangement suffers both from the problem of using a perpendicular slit and from having to tie a knot in the line.

In U.S. Pat. No. 3,340,644 to Lintz (1967), he uses a dual spool in a slightly different way in which he winds the line from the bobber to the hook around one spool and the line from the bobber to the rod around the other. He then uses several pins which extend across one of the spools as a means of regulating the amount of line which will feed off that reel when unwound. He does not appear to cross the line over or through a center ridge of one singular dual spool. Nevertheless, this design still suffers from the same basic flaws in that the line upon entering and exiting the bobber is offset to both the side and to the front or back in order to meet the inner spool surface. This again creates unwanted tension and friction between the line, the spool, and the bobber, which obstructs the proper working of the device.

In U.S. Pat. No. 3,364,613 to Sewell (1968), a more simple design is used. He attempts to compensate for the left right angle by offsetting the entry and exit holes to be more in line with the appropriate spool channel. This offsetting can create a torque pressure on the central axis or axle of the spool and create friction and pressure between the spool and the bobber housing. He also uses closed holes for entry and exit which necessitates removal of the hook when attaching and detaching the bobber. More importantly, he still forces the line to enter and exit at the top and bottom centers of the bobber. Therefore, there is still the significant bending of the line to meet the inner drum surface of the dual spool.

He also uses a simple perpendicular radiating slit as a means of crossing the line from one spool to the other. As mentioned earlier, this type of slit allows the line to pull out of the slit once all the line on one spool is unwound and to then cross over the center ridge and begin unwinding the same side which is winding up, thereby removing the stopping capacity of the bobber.

In U.S. Pat. No. 3,464,141 to Amlin (1969), a flotation drum is housed in a supporting bracket which also has an additional side flotation chamber. The flotation drum has three extended ridges which act to create the channels of a type of dual spool. Here again the line must be detached from the hook, threaded through the entry hole which is top center, bent sharply to the side to meet the drum surface of the dual spool, then bent back again sharply to the exit hole which is bottom center, and be reattached to the hook.

In U.S. Pat. No. 3,673,729 to Lintz (1972), he modifies his earlier patent of 1967 to include a combination of detachable dual spools and four lugs around which the line is wound. However, the operation and principles of this bobber are essentially the same as his earlier patent. This means that it suffers from the same problem of entering and exiting the bobber at top center and bottom center which sharply bends the line once it has entered the bobber thereby creating significant pressure and friction when any weight or tension is applied to the line. The entry and exit holes are also enclosed so that the line must be removed from the hook in order to attach or detach the bobber.

In U.S. Pat. No. 4,251,941 to Howard (1981), a more novel and complex use of dual spools is employed. Instead of passing the line from one spool to the other by means of a hole or slit in the center ridge, he passes the line through a hole in the actual inner drum surface of one spool through the center axle shaft and out through the other spool's drum surface. The purpose of passing the line through the axle shaft is to rigidly lock the line to the spool and bobber arrangement. One of the bobber halves is then rotated as the means of winding a desired amount of line onto one of the spools. Unfortunately he makes the same mistake as the other patents above. He assumes that the difficulty in getting the dual spool to rotate freely in the previous patents is due to the small diameter of the spools and consequently the limited amount of leverage the line has in turning the spools. Therefore, he attempts to make the diameter of his spools as large as possible in order to provide greater turning leverage for the line. This is a valid concept up to a point, but he misses the primary cause of friction and resistance in his and the other bobbers which is that the line enters and exits the bobber at or near top and bottom center and must therefore bend sharply within the bobber to meet the dual spool.

In U.S. Pat. No. 2,669,054 to Smith (1954) a type of dual spool is utilized. He takes one line from the hook and sinker and attaches it to one side of the spool by means of a hole passing directly through the spool and perpendicular to its axle. He then takes a second line from the fishing rod and reel and attaches it to the other side of the spool in a similar fashion. Rotation of the spool is regulated solely by means of a ratchet wheel and release mechanism. Smith's design suffers from several shortcomings. First, the lines enter and exit the bobber at top and bottom center. Secondly, he uses two separate lines, one to the hook and one to the rod which makes the use and adjustment of this design very awkward and time consuming. He does not allow one line to pass from the rod, onto one side of a dual spool, through a center ridge, around the other side of the spool and then out of the bobber. Thirdly, he uses a ratchet wheel with float release to lower the hook. Such mechanisms are complicated, heavy and unreliable when exposed to water and weeds.

In U.S. Pat. No. 3,141,256 to McBriar (1961) a type of dual spool is used between two bobber halves. Here again the line enters and exits the bobber at top and bottom center thereby placing tremendous strain and friction between the spool axle and the bobber housing. He also shows two slits angled in towards each other in a center ridge on the spool; however, he requires that the line be wrapped between these two slits one or more times in order to secure the line and prevent it from leaving the slits or jumping the center ridge.

In U.S. Pat. No. 2,795,077 to John (1956) a type of wheel-on-a-screw mechanism is utilized to regulate the depth of the hook. The fishing line is wrapped once around the wheel whose width is sufficient to hold one strand of line. In theory, as the line is pulled through the bobber, this turns the wheel which then moves the screw from one position to another. In actual use, screw mechanisms involve too much friction to be effectively activated by the lighter sinker weights and hooks which are desirable for more sensitive fishing detection. Attachment and detachment of the bobber is clumsy and difficult, requiring removal of metal plates and the use of fastening screws. There is no way to maintain tension on the line around the wheel, and so it can slip without turning the wheel. Also, because the wheel is only one line thickness in width, the line will tend to bind up at the point where the line crosses itself upon entry and exit to the wheel. The entry and exit points are really just the ends of an elongated groove carved into the side of the bobber so that the actual entry and exit points are not specific and can be anywhere from opposite to each other out to two separate lines perpendicular to the wheel.

In U.S. Pat. No. 3,084,468 to Christophel(1960) a hinge mechanism is used to house and release the hook and bait. The line must be wound around a spool everytime the bobber is to be cast out and the hook and sinker must be tucked inside the bobber as well. The hinges are not releasable and it relies on line tension to keep the bobber doors shut during casting, but such line tension disappears once the bobber is cast and moving through the air.

Objects and Advantages

Accordingly, of several objects and advantages of the instant invention, one is to provide a castable and adjustable fishing bobber which allows the bobber to move freely between the fishing hook and the operator's selected depth point on the line without the need for any type of line stoppers to be placed on the line such as beads, strings, springs, etc.

A further object is to provide a fishing bobber which is able to move freely between the fishing hook and the operator's selected depth point on the line without the friction and pressure which occurs in other designs whenever tension or weight is applied to the line.

A still further object is to provide a fishing bobber which is easy to attach and detach from the line without removing the hook or leader from the fishing line.

A further object is to provide a fishing bobber which is easy to adjust to varying fishing depths without having to remove the hook or leader from the line and without having to move a line stopper such as a bead, spring, or string.

A further object is to utilize the concept of a dual spool rotatably mounted between two bobber shells in conjunction with off-center placement of the fishing line entry and exit holes in the bobber shell in such a way that the fishing line passes between the entry and exit holes of the bobber shell in virtually a straight line and intersects the inner drum surfaces of the dual spool at a tangent, or less than 10 degrees, rather than perpendicular or at some steeper angle which can create tremendous friction and pressure within the bobber.

A still further object is to provide a dual spool with a slit in the central ridge which is not perpendicular to the inner drum surface of the spool, and whose shape is such that a line passed through it is unlikely to work its way out of this slit under normal operation, and through which the line may be passed easily without having to remove the hook from the line.

A further object is to provide a slit in the central ridge which is of a "zig zag", "J", "W", "Z", "dual lateral slits", or other such complex shape, which effectively folds back upon itself in such a way as to prevent the line from being unintentionally pulled out of the slit once all the line is wound off of one of the spools.

A further object is to provide a dual spool, the center ridge diameter of which is slightly larger than the inside diameter of the bobber and slightly larger than the left and right ridges of the dual spool and which center ridge consequently rotates within a small groove or channel along the inside perimeter of each of the mating surfaces of the two bobber halves in order to help prevent the line from ever jumping from one spool to the other should it manage to escape from the center ridge slit.

A further object is to provide a dual spool assembly which contains its own means of flotation so that it contributes to the overall flotation space of the bobber assembly.

A further object is to provide a bobber shell, of which each of its two halves contain an airtight flotation chamber and which bobber halves are hinged together at matching points along their circumference edge by means of either a "living hinge" or any number of mechanical hinge styles so that the two halves remain connected when the bobber is opened, thereby reducing the chance of dropping one of the pieces during use.

Further objects and advantages of my invention will become apparent from a consideration of the drawings and ensuing description.

List of Reference Numerals Used in the Figures to Denote Elements of the Invention 20. Cylindrical Recess in flotation chamber cap 44 for dual spool axle 24 to set in
21. Complete Bobber
22. Complete airtight Dual Spool Assembly
23. Detachable Hinge assembly
24. Dual Spool Axle
25. Pin and Clasp Latch assembly
26. Inner Drum Surface of dual spool 22
27. Latch Clasp of pin and clasp assembly 25
28. Center Ridge of dual spool 22
29. Recessed Channel around inside perimeter of half shell 34
30. Spool End Caps with axles
31. Latch Pin of pin and clasp assembly 25
32. Center Ridge Slit of center ridge 28
33. Entry and Exit slits in bobber shell for fishing line
34. Half Bobber Shell (both halves are identical except for color)
35. Sealed Floatation Chamber in each half of bobber half 34
36. Pivot Pins in half of detachable hinge 23
37. Hinge Clasps or Knuckles of detachable hinge 23

38. Ledge on Spool End Cap 30 for seating into drum surface 26
40. Line from bobber to fishing rod
42. Line from bobber to fishing hook
44. Floatation Chamber Cap
45. Opposing Floatation Chamber Cap with receiving catch 54
46. Ledge in Bobber Shell 34 to seat flotation chamber cap 44
48. Living Hinge connecting two bobber halves
50. Fixed Shaft for Spool rotation and connecting other bobber half
51. Threaded fixed shaft for spool rotation and shell connection
52. Compression Ridge on axle shaft 50
54. Double Chambered Receiving Catch for axle shaft & compression ridge
55. Threaded receiving catch for axle shaft 51
56. Bobber Shell Rotation Stops
58. Modified Dual Spool Assembly without axle
60. Axle Hole in Dual Spool 58 for axle shaft 50 to pass through
62. Longitudinal Slit in axle shaft 50
64. Dual parallel lateral slits in center ridge, drum, and end cap
66. Female threaded circumference edge on bobber half 34
68. Male threaded circumference edge on opposing bobber half 34

SUMMARY

My fishing bobber overcomes the problems of all the prior art by positioning the entry/exit line slits off-center and in such a relation to the dual spool that the entry and exit slits are in line with a tangent line to the outer surface of the spool, and a line drawn between said in-line slits would be perpendicular to the axle of said spool. Consequently, the fishing line behaves as though it were traveling in a continuous straight line through the bobber with the only pressure being applied as compression around the inner drum of the dual spool. This being applied as compression around the inner drum of the dual spool. This straight line/tangent configuration means that no pressure or friction is generated between the bobber, the spool, or the line when tension or weight is applied to the line. The compression force around the dual spool is of no consequence due to the high strength to weight ratio of a cylindrical drum structure. My invention also utilizes a different means of passing the fishing line from one spool to the other which allows easy attachment and detachment of the bobber without removing the hook from the line.

DETAILED DESCRIPTION OF INVENTION

Figure 1:
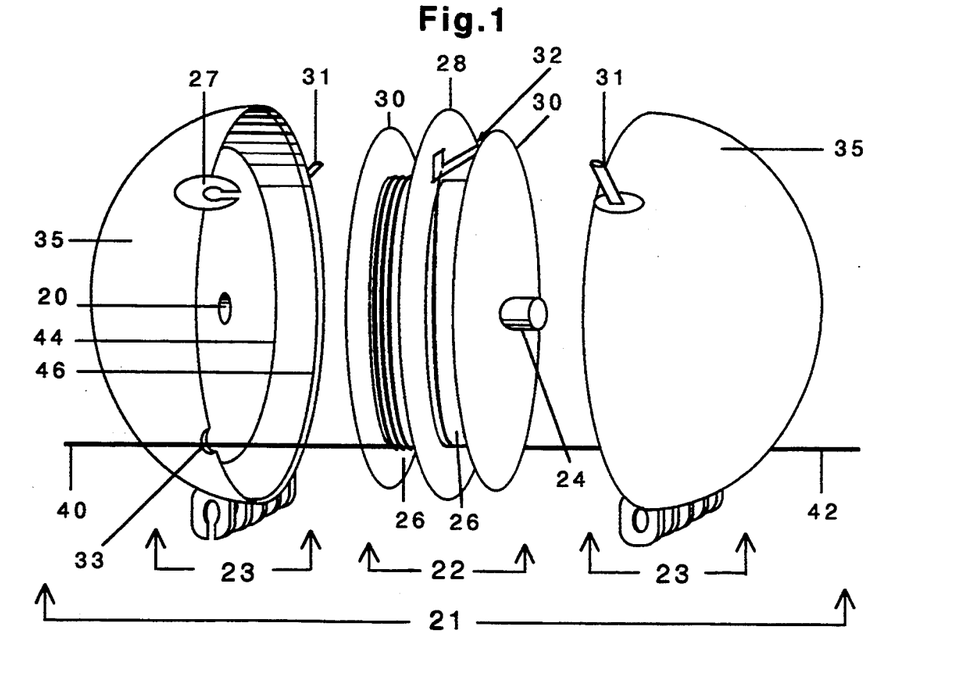
FIG. 1 shows an exploded view of a complete bobber with two bobber halves, a dual spool in-between, hinges, latches and a fishing line entering from the left, wrapping around the dual spool, and exiting to the right.
Figure 8:
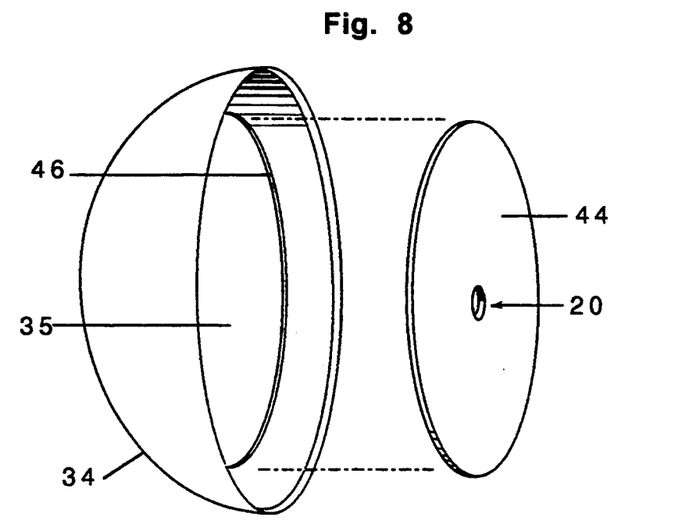
FIG. 8 shows a bobber half and its flotation chamber cap.

FIG. 1 shows an exploded view of a fishing bobber 21. A dual spool 22 is rotatably seated within two concave bobber halves 34. Each bobber half 34 contains an air tight flotation chamber 35 which is created by gluing or sonically welding a flotation chamber cap 44 into each bobber half 34 along an inset ridge 46 as shown in FIG. 8. At the center of each chamber cap 44 is a cylindrical recessed cavity 20 into which axle 24 of dual spool 22 is rotatably set.

Figure 2A:
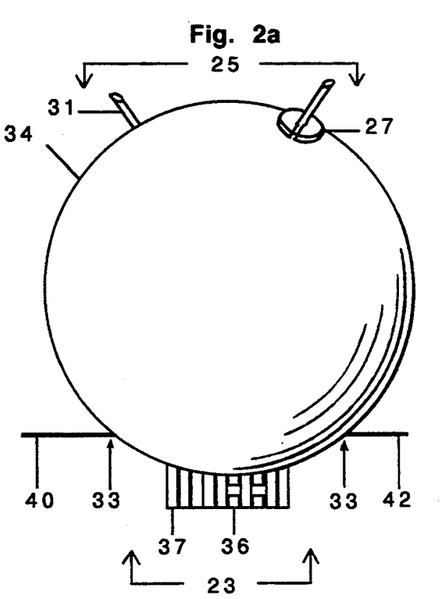
FIGS. 2a and 2b show a drawing of a bobber in an assembled and closed position with side and end views. It also shows the fishing line entering from the rod side and exiting towards the hook side of the bobber.
Figure 2B:
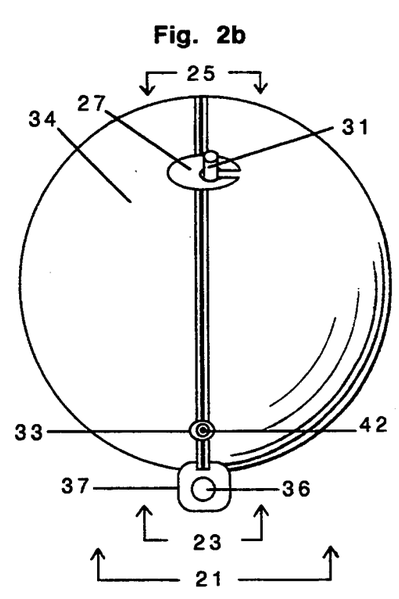

FIGS. 2a and 2b show a side and end view of the basic version of fishing bobber 21. The preferred outer shape of the bobber is a sphere, but could be any other suitable shape such as oval, egg, cone, cube, etc. as long as there is sufficient room inside to house a dual spool 22 as shown in FIG. 1.

Figure 10A:
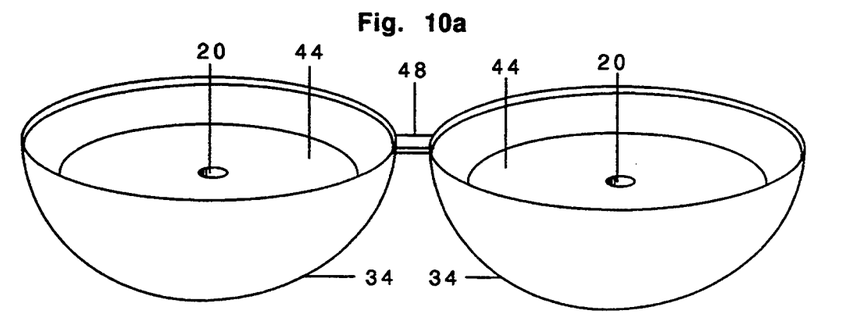
FIGS. 10a and 10b show an example of a living hinge connecting two bobber halves instead of a rigid detachable hinge.
Figure 11A:
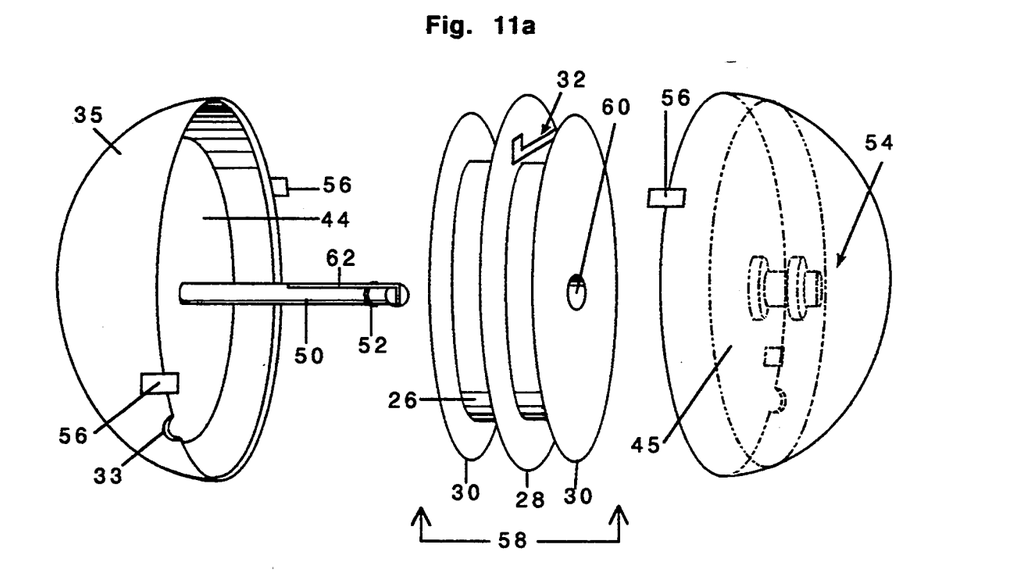
FIG. 11a shows an exploded view of an optional method of connecting the two bobber halves by means of an interlocking shaft.
Figure 11B:
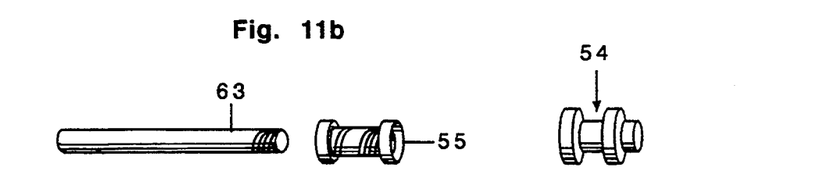
FIG. 11b shows a variation on the axle shaft of FIG. 11a wherein a threaded end and threaded receiving chamber are used.
Figure 13:
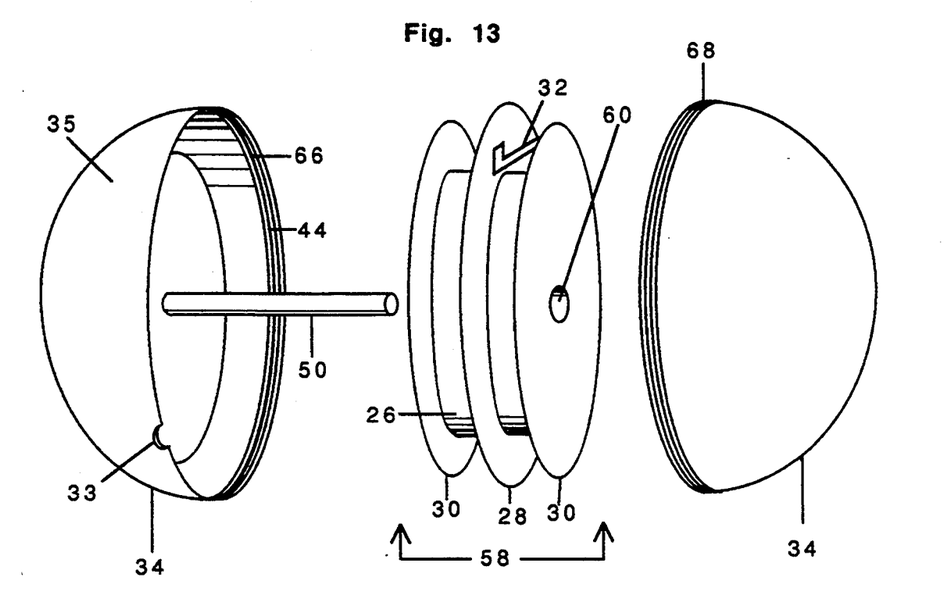
FIG. 13 shows an optional means of securing the two bobber halves together by means of threaded matching edges.

FIGS. 2a and 2b also show a fishing bobber 21 composed of two concave bobber halves 34. The size or diameter of this bobber 21 and its halves 34 can be of any desired size, but the preferred diameter of the complete bobber will range from 2.5 centimeters (1 inch) to 15 centimeters (6 inches). The two halves 34 are fastened together by means of a detachable hinge 23. One half of each hinge 23 is integrally molded along one edge of each bobber half 34. The bobber is held in a closed position by releasable means of two pin and clasp latch assemblies 25 which are integrally molded along the opposing edge of the bobber shell. Any other suitable hinge and clasp assembly can also be used, such as a living hinge 48 as shown in FIG. 10a, or a axle shaft connector 50 as shown in FIGS. 11a and 11b, or matching screw threading 66 and 68 along the mating circumference of each bobber half 34 as shown in FIG. 13, in order to screw the two halves together. In most applications, the two bobber halves 34 may be injection molded out of different colored plastics, for example, red on one side and white on the other side being the most common colors used.

Figure 6A:
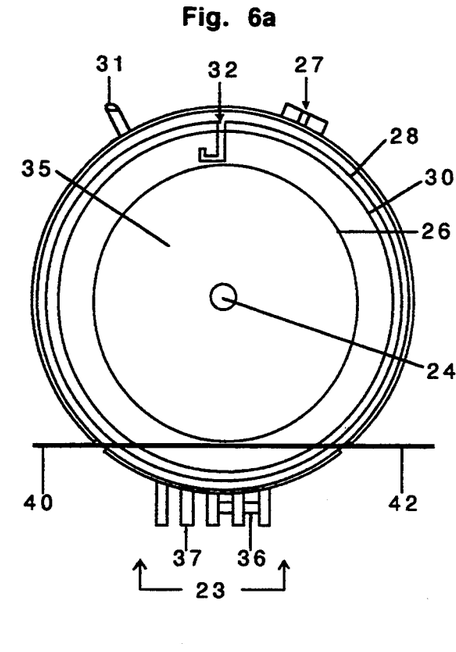
FIGS. 6a 6b show the positioning of the entry and exit slits in such a way that said entry and exit slits are in line with a tangent line to the outer drum surface of the spool, and a line drawn between said in-line slits would be approximately perpendicular to the axle of said spool. It also shows how the dual spool sits in one half of a bobber shell so that the center ridge can rotate within a groove or channel in the outer edge of the bobber shell.
Figure 6B:
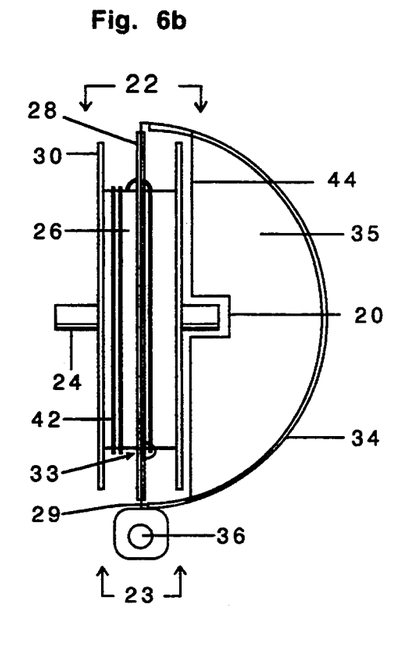

FIGS. 6a, 6b, and 8 show greater detail of a bobber half 34, each half of which is essentially identical, except for color, and each of which contains a water tight flotation chamber 35. This chamber 35 is created by gluing or sonically welding a flotation chamber cap 44 into a cap ledge 46 which is inset into the inside of bobber half 34 approximately one half the width of dual spool 22 from the circumference edge of the bobber half 34. In the center of each flotation cap 44 is an inset cylindrical cavity 20 into which the axle 24 of dual spool 22 is rotatably set.

Figure 3A:
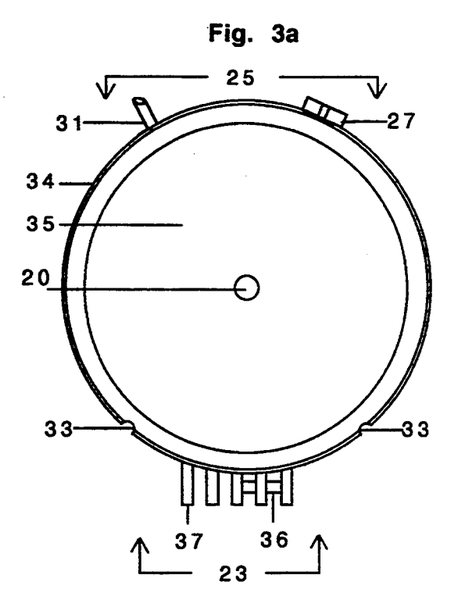
FIG. 3a shows an end view of one half of a bobber shell with more detail of the entry/exit line holes or slits, one half of a hinge, the pin and clasp portions of the latches and the sealed flotation chamber. Both bobber halves are essentially identical except in color.
Figure 9:
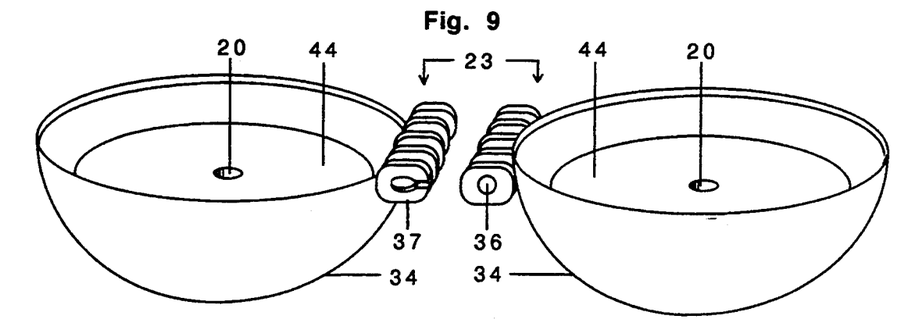
FIG. 9 shows a detachable hinge in its separated position.

FIGS. 3a, 6a, and 9 show half of a detachable hinge 23 which is injection molded as an integral part of bobber outer shell 34. Each half of hinge 23 is composed of two hinge clasps 37 and two hinge pins 36. When the two halves of hinge 23 are snapped together, the hinge clasps 37 of a first half snap around the hinge pins 36 of a second half, and the clasps 37 of the second half snap around the pins 36 of the first half. In order to either snap two bobber halves 34 together or apart, the bobber must be opened to 180 degrees so the halves may be pulled directly away or pushed directly towards each other, respectively. When the two halves 34 are in any other position, the hinge will not separate.

Figure 3B:
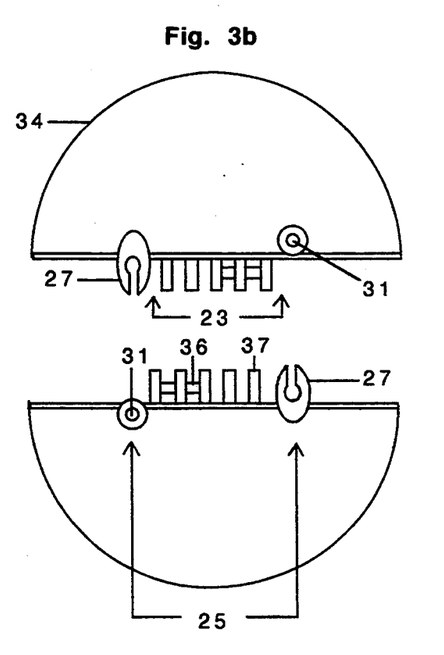
FIG. 3b shows a top view of two bobber halves in a separated position with more detail of the latch and clasp assembly.

FIGS. 3a and 3b also show greater detail of pin and clasp latch assembly 25, which is composed of a latch pin 31 and a latch clasp 27. These are preferably integrally molded into the outer shell of each bobber half 34 at approximately the 11 O'clock and 1 O'clock positions, as shown in FIG. 3a. Latch clasps 25 extend beyond the perimeter of bobber half 34 a sufficient distance so as to overlap the opposing bobber half 34 and secure latch pin 31. When two bobber halves are turned to face each other, the latch clasps 27 snap around and hold the latch pins 31 of the opposing half 34. FIG. 3a also shows, molded into the circumference edge of bobber half 34, opposing entry/exit slits 33 through which a fishing line 40 and 42 may pass when the bobber is in a closed position. The positions of entry/exit slits 33 are such that a straight line my be drawn from one slit 33 to the other slit 33 and the resulting straight line intersects the inner drum surface 26 of a dual spool 22 at, or within 10 degrees of, a tangent as shown in FIG. 1.

FIG. 3b also shows a top view of two bobber halves 34 in a separated position. Latch pins 31 snap into latch clasps 27 on the opposing bobber half 34 when the bobber is closed.

Figure 10B:
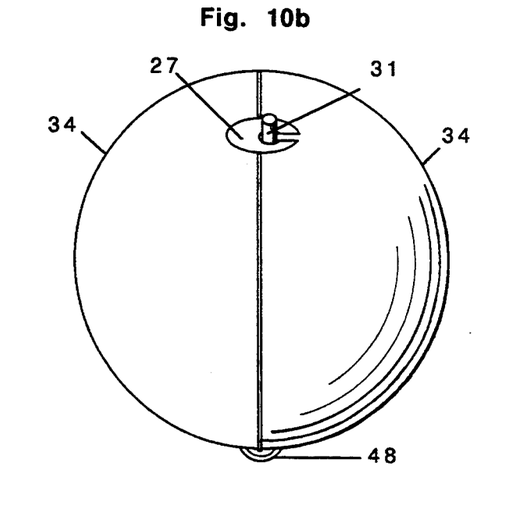

FIGS. 10a and 10b show an optional living hinge 48 which may be used to connect two bobber halves 34 instead of a detachable hinge 23.

Figure 4A:
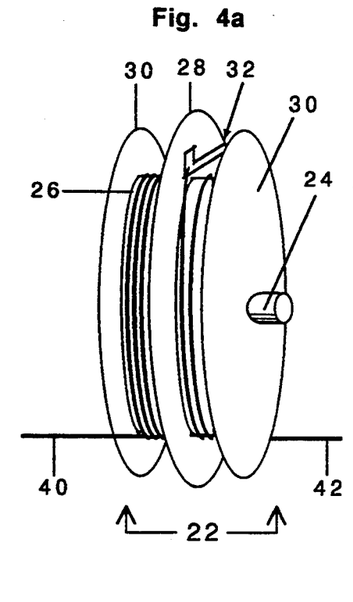
FIGS. 4a and 4b show a perspective and end view in which a fishing line from the hook is wound around one of the dual spool surfaces, passes through the center ridge slit and wraps once around the other spool surface before passing on to the fishing rod.
Figure 4B:
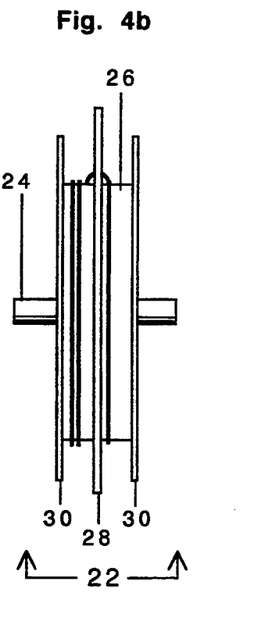
Figure 7:
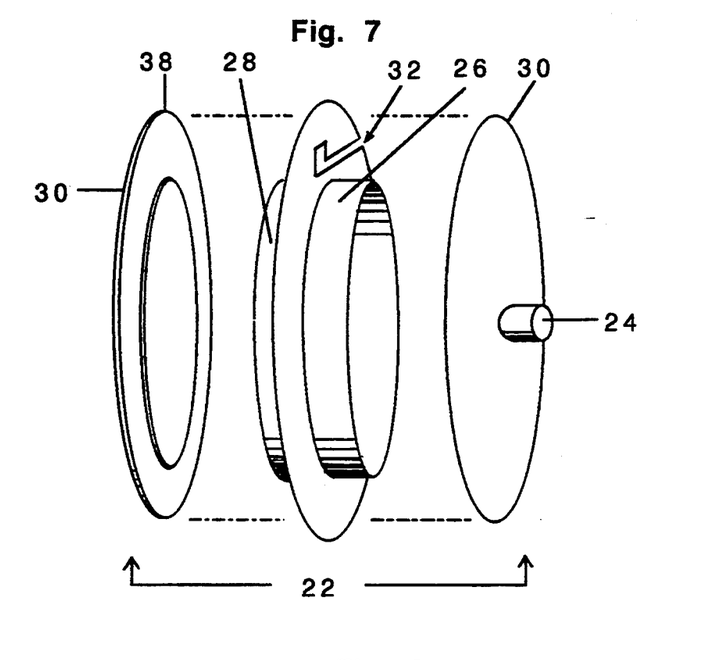
FIG. 7 shows an exploded view of a dual spool with its component parts.

FIG. 7 shows an exploded view of dual spool 22. Two end caps 30 are glued or sonically welded along a cap ledge 38 to opposite ends of a cylinder which acts as an inner drum surface 26 around which fishing line 40-42 is wound, as shown in FIGS. 4a and 4b. In the center of dual spool 22 is a center ridge 28 which extends outward perpendicular to the inner drum surface 26. The diameter of ridge 28 is slightly larger than the diameter of each end cap 30 and also slightly larger than the inside diameter of the complete bobber 21 when in its closed position. Center ridge 28 is thereby accommodated within bobber 21 by a recessed channel 29 molded into the perimeter edge of each bobber half 34 as shown in FIG. 6b.

In FIG. 4a a fishing line 40-42 is shown wound around one of the dual spool inner drum surfaces 26. It then passes through a slit 32 in center ridge 28 and is wound once around the second inner drum surface 26 of dual spool 22 and then passes on to a fishing rod.

Figure 5A:
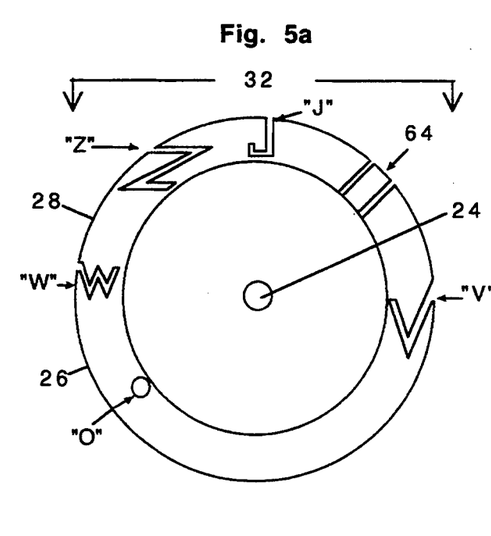
FIGS. 5a and 5b show more detail of various options for the line slit in the central ridge ranging from, but not limited to, a closed hole to shapes such as a "J", "V", "W", or a "Z" and optional dual lateral slits.

FIG. 5a shows a close up of a center ridge 28 of dual spool 22 with a variety of possible shapes and configurations which may be used as a central ridge slit 32. These slits 32 can vary from a "closed hole" to various complex shapes such as a "J", "V", "W", "Z" etc. Any shape will do which either folds back upon itself or in some way makes it difficult for a fishing line 40-42 to exit the slit by itself under normal use.

Figure 5B:
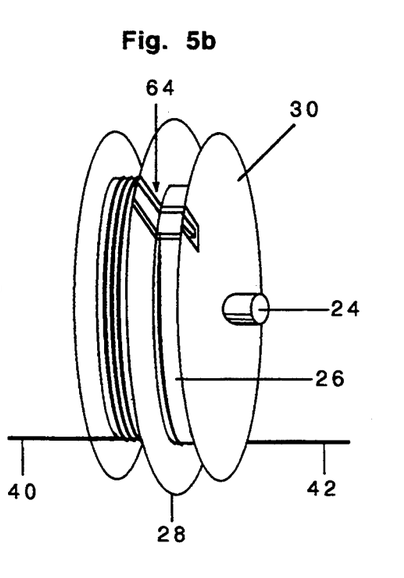

FIGS. 5a and 5b also show an optional dual lateral slit arrangement 64 which allows fishing line 40-42 to pass under both center ridge 28 and a portion of one inner drum surface 26, rather than through center ridge 28 as with slit 32.

FIGS. 11a and 11b show an optional method of connecting the bobber halves 34 without the use of a hinge and clasp arrangement. In FIG. 11a, an axle shaft 50 is molded as part of flotation chamber cap 44. It then extends through an axle hole 60 in dual spool 58 and is pressed into one of two chambers, for either a partially open or a fully closed position, in a double chambered receiving catch 54 which is molded in the flotation chamber cap 45 of the opposite bobber half 34. Shaft 50 is releasably held in place in receiving catch 54 by means of a compression ridge 52 integrally molded to shaft 50 near its end. This compression ridge is allowed to flex inward due to a longitudinal slit 62 in shaft 50. The second bobber half 34 is allowed to rotate partially around shaft 50 until rotation stops 56 contact each other in either direction of rotation.

FIG. 11b shows a variation on axle shaft 50 whereby the end of shaft 51 now has raised screw type threads. Modified receiving catch 55 has complimentary threading in both a forward and rear section separated by a non-threaded cylinder of slightly larger diameter than the raised threads of shaft 51. This non-threaded central portion of catch 55 allows limited free rotation of shaft 51 when its threaded portion is situated between the forward and rear threaded portions of catch 55.

Figure 12:
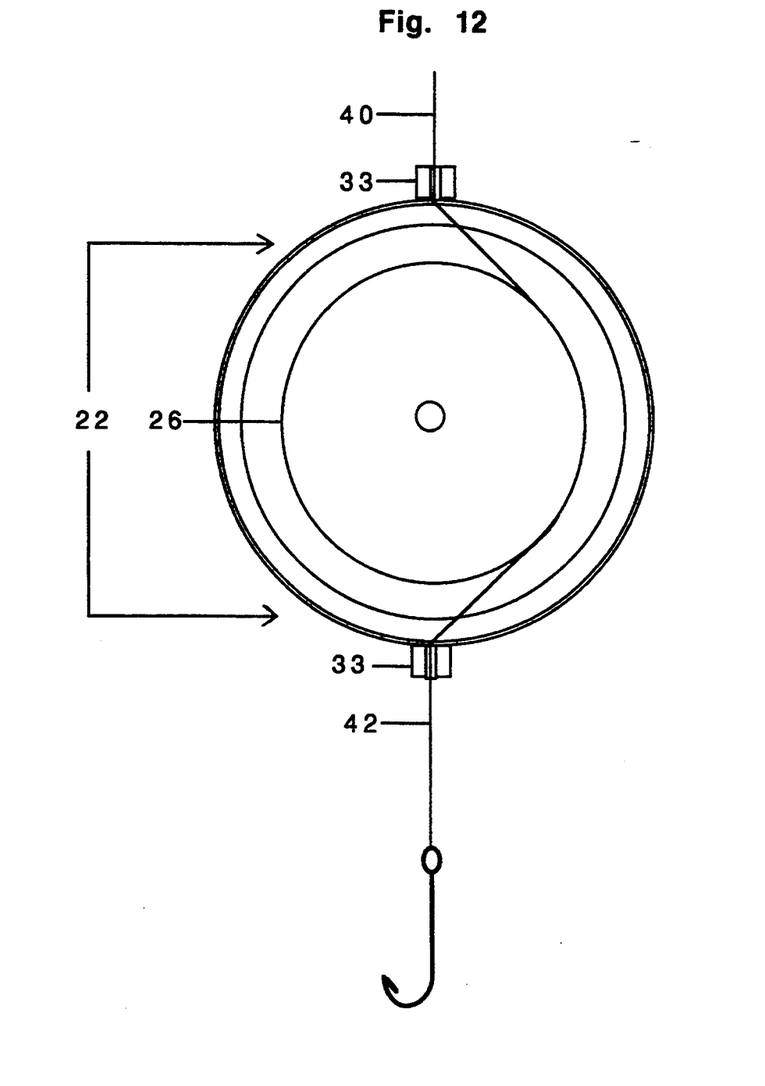
FIG. 12 shows a typical problem with all prior art where the line must bend after entering the bobber in order to meet the spool surface and then bend back again to exit the bobber.

FIG. 12 shows a typical example of prior art wherein line 40 enters at or near top center of bobber 21 through an entry/exit slit 33. Line 40 then angles sharply to the side to meet spool drum surface 26 and then angles back sharply to exit at or near bottom center through another entry/exit slit 33.

FIG. 13 shows an example of bobber halves 34 with a first half having male threading around its exterior circumference and a second half having female threading around its interior circumference edge as a means of securing the two halves together.

OPERATION OF INVENTION

In order to use the fishing bobber of the instant invention, one holds a closed bobber 21 as shown in FIG. 2b, in one hand, and with the thumb and forefinger of the other hand presses the two latch pins 31 in opposite directions so as to release them from the two latch clasps 27. Once the two latch assemblies 25 are released, the two bobber halves 34 are now held together at detachable hinge 23. The two halves 34 should now be opened or swung outward to 180 degrees from each other. Dual spool 22 as shown in FIG. 1 can now be lifted out of whichever bobber half 34 it is resting. If it should ever be necessary to replace one of the bobber halves 34, the two halves 34 can be pulled or snapped apart by opening the bobber to 180 degrees and then pulling the two halves 34 directly away from each other. Reassembly occurs in exactly the opposite manner.

At this point a desired fishing depth is chosen and measured off on fishing line 42 from the hook up towards the fishing rod. Once this point of depth is noted on the line 42, that point of line is slipped into center ridge slit 32 of the center ridge 28 of dual spool 22. Fishing line 42 should be inserted into slit 32 and moved down and back as far as it will go, as shown in FIG. 1.

Next, the remaining line 42 from the dual spool 22 down to a hook is wound around the right-hand spool inner drum surface 26 in a clockwise direction, if the entry/exit slits 33 are molded into the left-hand side of the bobber half 34 perimeter, or in a counter-clockwise direction if the slits 33 are molded into the right-hand perimeter surface of each bobber half 34. Either method of molding entry/exit slits 33 is acceptable. All the fishing line 42 is then wound up upon this one spool surface 26 until dual spool 22 is as close to the hook as desired.

Dual spool 22, with line 42 wound around it, is now set down into one of the bobber halves 34 so that line 42 passes directly from spool 22 out the corresponding entry/exit slit 33. As the bobber is now closed, the other end of the fishing line 40, which goes to the rod, passes out the opposite side of the bobber through the opposite entry/exit slit 33. As the bobber halves 34 are finally snapped together, line 42 from the hook should appear to pass from one entry/exit slit 33 to the other slit 33 in a straight line which intersects the inner drum surface 26 of dual spool 22 at a tangent, or within 5-10 degrees of a tangent.

Bobber 21 is now free to move up and down the fishing line 40-42 until it reaches either the preselected depth point or the point close to the hook where it was wound down to. At either of these points bobber 21 will stop without the need for any type of external stoppers, such as beads, springs, or strings.

The way in which this occurs is that as the bobber moves up or down the line, the passage of line 40-42 through the bobber 21 causes dual spool 22 to rotate since the line 40-42 is wrapped completely around one, or partially around both, of the inner drum surfaces 26 of spool 22. This rotation of dual spool 22 causes an equal amount of line 40-42 to be taken up on one inner drum surface 26 while the same amount of line is unwound from the other side of drum surface 26. This process continues as the bobber 21 moves along the line 40-42 until all line is unwound from one of the spool surfaces 26. At that point the line 40-42 is unable to unwind further because it passes through center ridge 28 by means of center ridge slit 32.

Since the shape of the center ridge slit 32 either folds back upon itself or zig-zags in such a way as to restrict the release of the line 40-42 from the slit 32, and since the diameter of center ridge 28 is slightly larger than the inside diameter of the bobber halves 34, and since center ridge 28 rotates within a groove or channel 46 in the perimeter of each bobber half 34, the line 40-42 is unable to "jump" this center ridge 28 and release line from the same drum surface 26 which it is being wound upon. Consequently, the movement of the bobber 21 stops when this point is reached in either direction of movement along line 40-42.

The optional use of a dual slits 64 allows line 40-42 to be wrapped around the left-hand side of inner drum surface 26, then dropped down through the left-hand dual slit 64, passed under both center ridge 28 and under a portion of the right-hand side of inner drum surface 26, then passed up through the right-hand dual slit 64 and on the other side of center ridge 28, as shown in FIG. 5b, and then passed out of the bobber shell 21 by means of entry/exit slits 31.

If it is desired to change the depth at which a hook is fished, one simply allows the bobber to move down the line 40-42 to the hook end of the fishing line 42. He then opens the bobber 21 as described above, removes the dual spool 22 and unwinds the line from drum surface 26 while leaving the line in slit 32. He then moves the dual spool 22 up or down the line to the new desired point of depth, and rewinds the line as described above. He finally inserts the spool 22 back into one of the bobber halves 34 as above and snaps the bobber shut. He is now ready to cast the bobber again.

Once a depth is selected and the bobber is attached to the line, bobber 21 is allowed to slide, or roll, down line 42 to the hook. The hook and bobber 21 are then cast together to the desired location. When the bobber and hook strike the water, they land in virtually the same location which insures accuracy of casting. Gravity then takes over due to the weight of the hook, or sinkers attached, and the hook gradually descends to the desired depth as dual spool 22 rotates within bobber 21 taking up an equal amount of line 40 from the rod as it unwinds line 42 to the hook.

When a fish is caught, line 40-42 becomes taught. However, bobber 21 remains free to move up and down the line as needed between the hook and the selected depth point while line 40-42 passes back and forth through bobber 21 with virtually no resistance. This is possible with this invention because the relative off-center placement of the two entry/exit slits 33 in relation to dual spool 22 allows line 40-42 to pass through bobber 21 in an approximate straight line which intersects the inner drum surfaces 26 of dual spool 22 at a tangent, rather than at a sharp angle as do all other prior art examples. Therefore, the only pressure exerted on, or within, bobber 21 is a compression force around each inner drum surface 26. This force has no impact upon the bobber halves 34, or the rotation of the spool axles 24 in their axles recesses 20, or the movement of line 40-42 through the two entry/exit slits 33.

Another modification of bobber 21 is shown in FIGS. 11a and 11b. The basic operation of this bobber is the same except in the way in which the bobber is opened or closed. In this example a cylindrical shaft 50 extends from the center of one of the flotation chamber caps 44. It then passes through hole 60 in modified dual spool 58 and acts as an axle for spool 58. The end of shaft 50 has a longitudinal slit 62 running from its tip part way along its axis. Shaft 50 also has a raised ridge or hump 52 on each side, separated by slit 62. The diameter of ridge 52 is slightly larger than hole 60 and is passed through hole 60 by means of slit 62 allowing shaft 50 to compress. Shaft 50 and ridge 52 are then passed into a double chambered receiving catch 54 which is molded as an integral part of the opposing flotation chamber cap 45.

Receiving catch 54 has two chambers, each of which has a diameter and width slightly larger than ridge 52. These two chambers are connected by a cylindrical pathway whose diameter is slightly less than ridge 52. When shaft 50 and ridge 52 are snapped into the first chamber of catch 54, the bobber halves are apart and access is available to dual spool 58 in order to attach, detach or wind and unwind fishing line. When shaft 50 and ridge 52 are pressed further into the second chamber of catch 54, the two bobber halves 34 are closed together in a snug but still rotatable position.

The two bobber halves 34 are allowed to rotate from approximately 120 degrees to 90 degrees relative to each other. Rotation is stopped by means of rotation stops 56 on each bobber half's outer perimeter. The reason for allowing this limited rotation is so that when the bobber 21 is resting on the surface of the water, with the hook suspended directly beneath, one entry/exit slit 33 can rotate to 90 degrees relative to the other and thereby direct line 40 back to the fishing. rod at a right angle to line 42, or parallel to the surface of the water. Then when tension is applied to the line 40-42, both bobber halves 34 rotate so that the two entry/exit slits 33 are more than 90 degrees apart to insure that line 40-42 passes straight through bobber 21 at a tangent to dual spool 58.

FIG. 11b uses raised threading on shaft 51 which either screws into one of two threaded sections of catch 55, or rotates freely in the middle portion of catch 55. In this version, rotation stops 56 are not needed and would be eliminated.

Conclusion, Ramifications and Scope of Invention

Thus it is seen that the castable and adjustable fishing bobber of the present invention provides a fishing bobber which is depth selectable without the use of line stoppers such as beads, springs, strings etc. It can also be easily attached to or removed from a fishing line without removing the hook from the line. More importantly, this fishing bobber allows the bobber to move freely along the line between the point of selected depth and the hook without any friction or pressure within the bobber which can hinder its movement as is the case with all prior art inventions. This is due to the unique placement of the fishing line entry and exit points relative to the dual spool contained within the bobber such that the entry and exit slits are in line with a tangent line to the outer drum surface of the spool, and a line drawn between said in-line slits would be perpendicular to the axle of said spool. This allows any force applied to the fishing line to be transferred directly through the bobber along this in-line axis with only a slight compression effect around the inner drum surface of the dual spool. No other bobber does this. Consequently, all others experience friction and binding within the bobber due to angling the line between the entry/exit points and the perimeter of the spool contained within the bobber. Also, the unique shape of the line slit in the center ridge of the dual spool is an improvement upon all other designs. It allows the bobber to be attached to or detached from the line at any point without having to remove the line from the hook or the reel while still insuring that the line will not leave the slit or jump the center ridge during use. Finally, the fact that the diameter of the center ridge is just slightly larger than the inside diameter of the bobber shell and rotates within a groove or channel in the shell further insures the line cannot jump the center ridge.

While my above description contains many specificities, these should not be construed as limitations on scope of the invention, but rather as an exemplification of preferred embodiments thereof. Many other variations are possible.

For example, any shape other than spherical is acceptable as long as it is capable of housing a dual spool within it in such as way that the entry and exit slits are in line with a tangent line to the outer drum surface of the spool, and a line drawn between said in-line slits would be perpendicular to the axle of said spool. Other methods of attaching and securing the bobber halves may also be used. The air flotation chambers can be replaced with other flotation materials such as closed cell foam or balsa wood, and the dual spool can vary in shape, size and design as long as it has some means of taking up line in one space while it unwinds line from an adjoining space.

Accordingly, the scope of the invention should be determined not by the embodiments illustrated, but by the appended claims and their legal equivalents.

I claim:

1. A fishing bobber capable of restricting its movement along a line between two selectable points on said line without external means of regulation or restraint, said line is selected from the group consisting of rope, wire, cable, and chain, said bobber comprising;
   a) an outer housing,
   b) a spool assembly having a cylindrical drum surface and an axis of rotation, said spool assembly rotatable set within said outer housing, said drum surface having a center ridge radially extending therefrom,
   c) entry and exit means for passing said line through said outer housing, wherein said entry and exit means are along a tangent line to said drum surface and said tangent line is perpendicular to said axis.

2. The fishing bobber of claim 2 wherein said spool assembly includes end caps adjacent said drum surface, said end caps radially extending such that the diameter of said end caps is greater than the diameter of said drum surface.

3. The fishing bobber of claim 1 wherein said center ridge has at least one hole therethrough.

4. The fishing bobber of claim 1 wherein said center ridge has at least one slit therein.

5. The fishing bobber of claim 4 wherein said at least one slit in the center ridge is non-radially aligned and open at an outer edge of said center ridge.

6. The fishing bobber of claim 5 wherein the shape of said at least one slit is selected from the group consisting of a "J", "V", "W", and "Z" shape.

7. The fishing bobber of claim 5 wherein a second portion of said at least one slit folds back towards a first portion of said at least one slit to form an acute angle between said portions.

8. The fishing bobber of claim 4 wherein said at least one slit comprises two radial slits extending from below the drum surface to the outer edge of said center ridge.

9. The fishing bobber of claim 8 wherein said spool assembly includes two slits in the drum surface perpendicular to said two radial slits in the center ridge, and said spool assembly further comprising end caps adjacent the drum surface, said end caps radially extending such that the diameter of said end caps is greater than the diameter of said drum surface, wherein one of said end caps has two radial slits extending from below the drum surface to an outer edge of said end cap, said two radial slits in said end cap parallel to the two slits in the center ridge, and said two radial slits in said end cap connected by a slit below the drum surface.

10. The fishing bobber of claim 1 wherein said outer housing encompasses said spool assembly.

11. The fishing bobber of claim 10 wherein said housing comprises two halves.

12. The fishing bobber of claim 11 wherein said housing has hinge means for hinging the two halves together.

13. The fishing bobber of claim 12 further including connection means for releasably securing the two halves together.

14. The fishing bobber of claim 11 wherein each of said halves contain an air tight floatation chamber.

15. The fishing bobber of claim 14 wherein said halves each contain a chamber cap sealed to said housing for providing said air tight floatation chamber, and each of said chamber caps have a recess cavity for supporting a spool assembly axle.

16. The fishing bobber of claim 11 wherein one of said halves has a chamber cap therein for providing an air tight floatation chamber, said chamber cap having an axle perpendicular thereto for supporting said spool assembly along said axis of rotation.

17. A fishing float capable of restricting its movement along a line between two selectable points on said line without external means of regulation or restraint, said float comprising;
   a) an outer housing,
   b) a spool assembly having a cylindrical drum surface and an axis of rotation, said spool assembly rotatable set within said outer housing, said drum surface having a center ridge,
   c) entry and exit means for passing said line through said outer housing, wherein said entry and exit means are along a tangent line to said drum surface and said tangent line is perpendicular to said axis.

18. A fishing float capable of restricting its movement along a line between two selectable points on said line without external means of regulation or restraint, said float comprising;
   a) an outer housing,
   b) a spool assembly having a cylindrical drum surface and an axis of rotation, said spool assembly rotatable set within said outer housing, said drum surface having a center ridge therearound,
   c) entry and exit means for passing said line through said outer housing, wherein when tension is applied to said line, said entry and exit means locate along a tangent line to said drum surface and said tangent line is perpendicular to said axis.

* * * * *